United States Patent Office 3,410,766
Patented Nov. 12, 1968

3,410,766
PRODUCTION OF THICK ANODIC OXIDE FILMS ON TITANIUM AND PRODUCTS THEREOF
Paul F. Schmidt, Allentown, Pa., assignor to Westinghouse Electric Corporation, Pittsburgh, Pa., a corporation of Pennsylvania
No Drawing. Filed Apr. 8, 1965, Ser. No. 446,717
5 Claims. (Cl. 204—14)

ABSTRACT OF THE DISCLOSURE

Titanium and titanium base alloys are anodized at voltages of up to 150 volts in a non-aqueous electrolyte having as an essential component anhydrous phosphoric acid containing at least 80% by weight of $P_2O_5$; an anhydrous organic liquid may be used as a diluent for the phosphoric acid.

This invention relates to the production of oxide films on titanium and titanium-base alloys by anodic oxidation techniques, and more particularly to the production of anodic oxide films on titanium for electrolytic capacitors, dielectric devices and the like.

As is known, there are many applications in the electrical industry where metal electrodes are required on which a dielectric oxide coating has been formed, usually by anodic oxidation techniques. For example, the usual electrolytic capacitor employs such electrodes as do numerous dielectric devices. In any application of this type, it is highly desirable to employ an anodic oxide film with as high a dielectric constant as possible, the obvious reason being that the higher the dielectric constant, the greater the power handling capabilities of the device for a given size.

In the past, the most suitable material for this purpose has been considered to be tantalum coated with a layer of tantalum oxide, notwithstanding the lower cost and weight of titanium and the fact that the dielectric constant of titanium dioxide films on titanium is higher than that of tantalum oxide. The reason for this has been the difficulty experienced in attempting to grow high dielectric quality titanium dioxide films to appreciable thicknesses. The maximum forming voltage capable of yielding good quality anodic oxide films on titanium appears to have been approximately 50 volts. While attempts have been made to grow oxide films on alloys of titanium, here again the forming voltage is limited to about 50 volts with conventional electrolytes.

As an overall object, the present invention seeks to provide a method for forming high quality, pore-free anodic oxide films on titanium and titanium-base alloys, which films have a thickness higher than those heretofore achieved.

Another object of the invention is to provide a method for forming anodic oxide films on titanium, the films having high dielectric strengths, low leakage currents, low dielectric losses and high capacitance.

Another object of the invention is to provide a method for forming anodic oxide films on titanium and titanium alloys to 150 volts and higher.

A further object of the invention is to provide for anodizing titanium and titanium alloys in a non-aqueous forming electrolyte containing, as an essential constituent, a phosphorus compound.

Another object of the invention is to provide for anodizing titanium metal in a forming electrolyte containing about 80% or more $P_2O_5$ by weight.

A still further object of the invention is to provide a titanium or titanium alloy element coated with an anodic oxide layer of greater thickness than heretofore achieved.

The present invention resides in the discovery that anodic oxide films can be grown on titanium to 150 volts and higher providing that the titanium metal, in pure form or alloyed with other metals, is anodized in an essentially anhydrous forming electrolyte containing about 80% or more $P_2O_5$, by weight. While it is known to use commercially available phosphoric acid, e.g., 85% $H_3PO_4$, alone, or sometimes in combination with other constituents, as an electrolyte for anodizing titanium, such commercially available acids are in aqueous solution, a condition which is entirely unsatisfactory for uniform oxide films of any appreciable thickness. In accordance with the present invention, oxide films are produced on titanium and base alloys thereof by anodic treatment at 150 volts and higher with an electrolyte which preferably comprises dehydrated orthophosphoric acid by itself or in combination with other inert organic solvents such as tetrahydrofurfuryl alcohol; the particular type or form of phosphoric acid being unimportant as long as it contains about 80% or more $P_2O_5$, under which conditions the acid is essentially anhydrous.

The temperature for anodization may be up to about 100° C., though good results are had at room temperature. The current density may be held relatively constant, at, for example one milliampere per square centimeter, and the voltage increased until it reaches a constant value.

The anodization may be continued for as long as 1 to 2 hours.

In carrying out the invention, it is preferable to employ pure titanium metal foil or sheet, or a titanium-base alloy foil or sheet. However, wire, plate, or other forms of metal may be anodized. The particular alloying elements employed are unimportant as regards the anodization process as long as they are not attacked by the phosphoric acids employed in the electrolyte. For example, alloys of titanium with small amounts of zirconium, niobium, tantalum, up to a total of 25% of one or more may be treated in accordance with the invention. The manner in which titanium or titanium alloy foil can be obtained is well known in the art and need not be discussed herein. A number of suitable techniques are set forth in application S.N. 405,343 filed Oct. 21, 1964, now U.S. Patent No. 3,331,993.

The foil is initially etched by conventional procedures to clean the surface, using for example, trichloroethylene or concentrated phosphoric acid, and then subjected to the critical anodizing treatment of the invention wherein the forming electrolyte is essentially anhydrous and contains as an essential component phosphorus containing ions. As mentioned above, a phosphoric acid having about 80% or more $P_2O_5$ (by weight) is a critical component for the forming electrolyte. Phosphoric acids are commercially available as orthophosphoric acid which is viscous liquid formed by dissolving phosphorus pentoxide ($P_2O_5$) in water. The usual commercial acid, comprising about 85% $H_3PO_4$ or 61.5% $P_2O_5$, is completely unsatisfactory for anodizing titanium and, fails to produce acceptable dielectric oxide films. However, water can be eliminated from orthophosphoric acid ($H_3PO_4$) to derive various concentrated precursors of the orthophosphoric acid such as meta-phosphoric acid ($HPO_3$) and pyro-phosphoric acid ($H_4P_2O_7$), all of which acids contain about 80% or more $P_2O_5$ by weight. Thus, when commercially available orthophosphoric acid is subjected to heat and dehydration, there results a higher phosphoric acid, or mixture of acids, which are anhydrous in nature. Such a mixture of acids formed by dehydration of commercially available orthophosphoric acid is referred to herein as an "anhydrous polyphosphoric acid."

While anhydrous polyphosphoric acid containing about 80% or more $P_2O_5$ by weight can be used quite successfully by itself for the forming of oxide films, forming in such very concentrated electrolytes is limited to low voltages, usually not exceeding about 50 volts. Higher forming voltages on the order of 150 volts or higher, have been successfully applied to titanium upon dilution of the anhydrous polyphosphoric acid electrolyte in a non-aqueous organic solvent such as tetrahydrofurfuryl alcohol. Another satisfactory organic solvent is dimethyl formamides. Organic phosphates such as triethyl phosphate are good solvents. As solvents the anhydrous glycols also may be employed, for example, ethylene glycol, triethylene glycol and propylene glycol, as well as mixtures of two or more. The particular organic solvent employed is unimportant as long as it is non-aqueous, stable under conditions of use and does not attack or react with the titanium dioxide film and forms a solution at temperatures of use.

Example I

As an example of the invention, pure titanium foil having less than 300 p.p.m. of iron, less than 130 p.p.m. of carbon, less than 750 p.p.m. of oxygen and only minute quantities of other elements, 1 inch by 1 inch and having a thickness of about 10 mils was etched and then subjected to anodization in a solution of 15% polyphosphoric acid, by volume, in tetrahydrofurfuryl alcohol. The polyphosphoric acid was derived by heating commercially available orthophosphoric acid at 300° C. for 10 minutes to produce at solution having over 80% $P_2O_5$. Anodization was carried out at a current density of about 2 milliamperes per square centimeter using a platinum cathode until the forming voltage reached 155 volts. At this point, a pore-free titanium dioxide layer having a thickness of about 3800 Angstrom units was formed on the titanium film. On tests, the decay of the leakage current at constant voltage was fully satisfactory, and reminiscent of the forming of such metals as tantalum or zirconium. It was, furthermore, noticed that upon rinsing the anodized sample with water the leakage current increased materially. Rinsing with toluene, however, is satisfactory.

The titanium foil is an 84.5% $P_2O_5$ polyphosphoric acid can be successfully anodized at voltages up to about 55 volts. Excellent dielectric films are obtained.

Example II

As another example of the invention, titanium foil having the same purity as that given above in connection with Example I and of the same dimensions was etched and subjected to anodization in a solution of 10% polyphosphoric acid, by volume, in tetrahydrofurfuryl alcohol. Anodization was carried out at a current density of about 1.75 milliamperes per square centimeter until the forming voltage reached 150 volts. At this point, a pore-free titanium dioxide layer was formed on the titanium film, the oxide layer having a thickness of about 3300 Angstrom units.

Example III

Titanium-silicon alloy foil containing 8-1/2% silicon, the remainder titanium, was subjected to anodization in a soluiton of 15% polyphosphoric acid, by volume, in tetrahydrofurfuryl alcohol. The sample had a thickness of about 10 mils, and the polyphosphoric acid was again derived by heating commercially available orthophosphoric acid at 300° C. for ten minutes. Anodization was carried out at a current density of about 2 milliamperes per square centimeter until the forming voltage reached 155 volts. A pore-free titanium dioxide layer was formed on the titanium alloy film having a thickness of about 4000 Angstrom units.

Example IV

Titanium disilicide ($TiSi_2$) foil having a thickness of about 10 mils was treated in the same manner as set forth in Example III. The results were equally as good, the titanium dioxide layer having a thickness of about 3800 Angstrom units when anodixed to a forming voltage of 155 volts.

Good results are obtained on anodizing titanium foil in polyphosphoric acid dissolved in dimethyl formamide, up to 90% by volume, and in triethyl phosphate up to 80% by volume.

The anodized titanium and titanium base alloy can be employed for various dielectric devices such as memory, tunneling and space charge limited devices, as well as various capacitors.

Using radioactive phosphorus added to the polyphosphoric acid, it is found that a small amount of the phosphorus is present in the titanium dioxide film after anodizing. The order of 5% of phosphorus was present in the film.

While the invention has been described with reference to particular preferred embodiments thereof, it will be appreciated that variations and modifications can be made.

I claim as my invention:

1. In the process for forming an anodic oxide film on titanium and titanium base alloy elements, the step of anodizing at voltages of up to 150 volts and higher the element in a non-aqueous electrolyte containing as an essential component at least of the order of 10% by volume of phosphoric acid having about 80% or more of $P_2O_5$ by weight.

2. The process as set forth in claim 1 for forming an anodic oxide film on titanium and titanium base alloy elements, of anodizing at voltages of up to 150 volts and higher wherein the non-aqueous electrolyte contains at least of the order of 10% by volume of metaphosphoric acid.

3. The process as set forth in claim 1 for forming an anodic oxide film on titanium and titanium base alloy elements, wherein the non-aqueous electrolyte contains at least of the order of 10% by volume of pyrophosphoric acid.

4. The process as set forth in claim 1 for forming an anodic oxide film on titanium and titanium base alloy elements, where the non-aqueous electrolyte comprises a mixture of at least about 10% by volume of a polyphosphoric acid comprising about 80% or more of $P_2O_5$ by weight and the balance being a non-aqueous organic solvent which is chemically inert with respect to the anodic oxide thus formed.

5. A member of a metal selected from the group consisting of titanium and titanium base alloys having a dense, adherent dielectric oxide film thereon, the film having been produced by anodizing at voltages of from 50 to 150 volts and higher the member in a non-aqueous electrolyte containing as an essential component at least of the order of 10% by volume of phosphoric acid having at least 80% of $P_2O_5$ by weight.

References Cited

UNITED STATES PATENTS

| | | | |
|---|---|---|---|
| 2,264,899 | 12/1941 | Georgiev | 252—62.2 |
| 2,830,237 | 4/1958 | Ross | 252—62.2 XR |
| 2,934,682 | 4/1960 | Schwarz et al. | 317—230 |
| 2,943,031 | 6/1960 | Wainer | 204—56 XR |
| 2,965,816 | 12/1960 | Ross | 317—230 |
| 3,262,867 | 7/1966 | Callahan | 204—56 XR |
| 3,300,693 | 1/1967 | Ross et al. | 252—62.2 XR |
| 3,331,993 | 7/1967 | Brown et al. | 204—39 XR |

FOREIGN PATENTS 806,234 12/1958 Great Britain.

HOWARD S. WILLIAMS, *Primary Examiner.*

G. KAPLAN, *Assistant Examiner.*